Nov. 7, 1967 G. E. KELLY 3,351,708
SYNCHRONOUS DEMODULATORS
Filed April 26, 1965
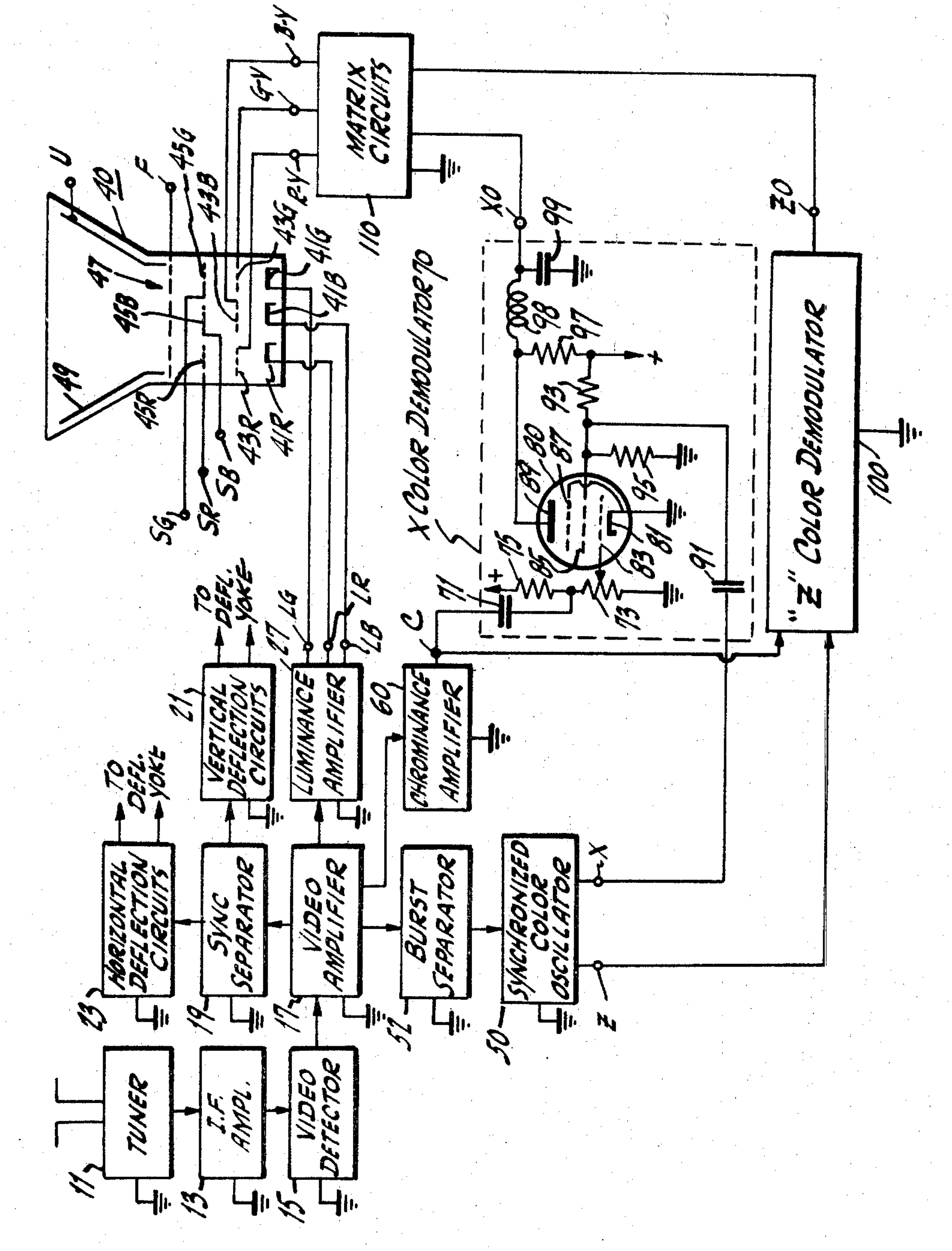
INVENTOR.
GORDON E. KELLY
BY William H. Meagher
Attorney 3,351,708
SYNCHRONOUS DEMODULATORS
Gordon E. Kelly, Indianapolis, Ind., assignor to Radio Corporation of America, a corporation of Delaware
Filed Apr. 26, 1965, Ser. No. 450,669
3 Claims. (Cl. 178—5.4)

ABSTRACT OF THE DISCLOSURE

A relatively inexpensive power pentode (e.g., such as one having its third, or suppressor, grid internally shorted to the cathode) is used as a color demodulator, heterodyning received chrominance signal (comprising modulated color subcarrier waves) with local color reference oscillations. Chrominance signal is applied to control grid, while reference oscillations are applied to screen grid along with unidirectional operating potential quite low in comparison to screen grid potential rating. Control grid is biased to continually draw grid current; under such grid current conditions relatively small screen grid potential variations significantly affect anode current magnitude.

This invention relates generally to synchronous demodulators, and, in particular, to synchronous demodulation arrangements suitable for performing the desired demodulation of a modulated color subcarrier in a color television receiver.

In color television receivers adapted to utilize the standard color television signal as broadcast in accordance with FCC regulations, it is requisite to provide independent color information signals from the modulated color subcarrier (which constitutes the chrominance signal component in the standard signal). Different devices have been proposed and utilized in the performance of this color demodulation function, such devices ranging from crystal diodes through thermionic triodes up to expensive pentagrid-type tubes.

In general, the demodulator arrangements that achieve the desired heterodyning of the received chrominance signal with local color reference oscillations through use of relatively inexpensive devices, such as diodes or triodes, have involved cost saving in the demodulator device, but at the expense of performance, and/or accompanied by increase of expense in some other area of the receiver.

The present invention is directed toward achievement of the color demodulator function with use of relatively inexpensive demodulating devices, without substantial sacrifice of performance, and without relegating expense to another area of the receiver in order to maintain an adequate performance level.

Multigrid tubes of the type including two independent control grids are ideal for performing the color demodulation function, in the sense that a sizable output, representing the desired heterodyne product, can be obtained therefrom in response to relatively low level input signals (whereby appreciable gain demands are not placed upon the circuits supplying signals to the demodulators), and with adequate isolation established between the two sources that supply the signals to be heterodyned. The drawback to the use of such excellently performing devices is their considerable expense.

In accordance with the present invention, performance rivalling that obtainable from the above-described expensive multigrid devices is achieved by using less expensive pentode power tubes (i.e., tubes, such as the 6AQ5 or 6GH8, wherein the third grid has no significant control effect capabilities, and is, indeed, internally tied to the cathode). A key to the indicated performance achievement is operation of the demodulator tube in such manner that the screen grid (i.e., the second grid) requires very little positive voltage to provide peak currents, whereby a signal of relatively low level applied thereto may effect considerable control over the output current. The synchronous demodulation function desired in a color demodulator thus may be achieved, producing high level output signals in response to relatively low level inputs, with adequate isolation maintained between the input signal sources, though the device employed is a relatively inexpensive power pentode.

An object of the present invention is thus to provide novel and improved synchronous demodulators providing efficient achievement of relatively high level outputs.

Another object of the present invention is to provide a relatively inexpensive color demodulation arrangement providing high level performance with relatively inexpensive demodulator devices.

Other objects and advantages of the present invention will be readily recognized by those skilled in the art upon a reading of the following detailed description and an inspection of the accompanying drawing in which a color demodulator operating in accordance with the present invention is illustrated schematically, in the setting of a color television receiver, generally shown in block diagram form.

Referring to the drawing, a color television receiver is therein illustrated of a general form corresponding, for example, to the RCA CTC–10 color television chassis (set forth in schematic detail in the RCA Service Data pamphlet designated 1960 No. T5). The illustrated receiver includes an RF tuner 11, which serves to selectively convert a broadcast RF signal to intermediate frequencies for amplification in an IF amplifier 13; the output of IF amplifier 13 is supplied to a video detector 15, which recovers from the modulated picture carrier a composite video signal. This composite video signal is amplified in a video amplifier 17, which provides outputs for application to a variety of signal utilization channels in the receiver.

One output of the video amplifier is supplied to a deflection sync separator 19, which separates the deflection synchronizing pulses from the remainder of the composite video signal, and supplies these synchronizing pulses to respective vertical and horizontal deflection circuits, 21 and 23, respectively. These deflection circuits generate properly synchronized line and field deflection waveforms for application to a deflection yoke (not illustrated), which is associated, for usual raster development purposes, with a color image reproducing device.

Illustratively, the color image reproducing device is constituted by a tri-gun, shadow mask color kinescope 40; the operating electrodes of the color kinescope 40 include: a trio of cathodes 41R, 41B and 41G; a trio of control grids 43R, 43B, and 43G; a trio of screen grid electrodes 45R, 45B and 45G; a commonly energized focussing electrode structure 47; and a final accelerating or ultor electrode 49. A suitably stabilized high voltage is supplied to the ultor electrode via its energizing terminal U, while a lesser unidirectional potential (preferably adjustable) is supplied to the focus electrode energizing terminal F. Individually adjustable unidirectional voltages are supplied to the respective screen grid terminals $S_R$, $S_B$ and $S_G$.

Control of the brightness of the image reproduced by kinescope 40 is effected by the luminance signal component of the composite video signal, which is amplified in a luminance amplifier 27 (responding to an output of video amplifier 17). The luminance amplifier output appearing at the amplifier output terminal L is applied directly to the cathode 41R. Adjustment of the relative amounts of the luminance drive energizing the cathodes of the respective guns of kinescope 40 is achieved through the interposition of the potentiometers 35 and 37 in the luminance signal path from terminal L to the remaining two kinescope cathodes 41B and 41G, respectively.

To effect the necessary synchronous demodulation of the modulated color subcarrier which constitutes the chrominance signal component of the received composite video signal, it is requisite to provide a local source of oscillations of the nominal color subcarrier frequency, which source is maintained in suitable frequency and phase synchronism. In the illustrated receiver, the color reference oscillator 50 serves as the local oscillation source. The color synchronizing component of the received composite video signal, which component takes the form of a burst of subcarrier frequency oscillations of reference phase, is separated from the remainder of the composite video signal by a burst separator 52 responding to an output of video amplifier 17. Time selection as well as frequency selection is employed in the burst separation achievement, the burst separator responding to gating pulses derived from the horizontal deflection circuits 23. The burst output of burst separator 52 is compared in phase with an output of oscillator 50 in a phase detector 54; departures from the proper phase synchronism are detected in the latter, from which is derived a control voltage for application to a reactance tube 56. The reactance tube 56, associated with the frequency determining circuitry of oscillator 50, effects a phase correction of oscillator 50 in response to the output of phase detector 54. It will be readily appreciated that the automatic frequency control approach to synchronization of oscillator 50, exemplified by the above-described use of elements 54 and 56, is described herein by way of example only; one well known alternative comprises use of the technique of injection locking of the color oscillator.

The chrominance signal component of the received composite video signal is selectively amplified in a chrominance amplifier 60, responding to an output of video amplifier 17. The output of the chrominance amplifier, appearing at output terminal C, is supplied to a pair of color demodulators 70 and 100, respectively. Respective differently phased outputs of oscillator 50 (appearing at the oscillator output terminals X and Z, respectively) are also applied to the respective demodulators 70 and 100.

Only one of the demodulators (the X demodulator 70) has been illustrated in schematic detail, but it should be understood that the other demodulator (the Z demodulator 100) may conform to this same schematic arrangement.

The demodulating device employed in the X demodulator 70 is a pentode 80, which may be of a relatively inexpensive type (e.g., 6AQ5). The pentode electrodes consist of a cathode 81, a control grid 83, a screen grid 85, a suppressor grid 87 (internally shorted to the cathode 81) and an anode 89.

The cathode 81 of pentode 80 is directly connected to chassis ground. The control grid 83 receives chrominance signals from the chrominance amplifier terminal C via a blocking capacitor 71 and a saturation control potentiometer 73. The blocking capacitor 71 is coupled between the terminal C and one fixed terminal of the potentiometer 73, the other fixed terminal of the potentiometer being grounded; the control grid 83 is directly connected to the adjustable tap on potentiometer 73. Adjustment of the position of the potentiometer tap varies the amplitude of the chrominance signal component supplied to the demodulator, whereby to control the saturation of the reproduced colors.

In addition to the chrominance signal component, a positive DC bias is supplied to the control grid 83 so as to maintain the control grid 83 positive relative to the cathode 81. The supplying of this bias is simply effected in the illustrated circuit by returning the junction of capacitor 71 and potentiometer 73 to the source of B+ potential in the receiver by means of a series dropping resistor 75.

Local color reference oscillations of a desired phase, appearing at the oscillator output terminal X, are coupled to the screen grid 85 of pentode 80 via a coupling capacitor 91. A pair of resistors 93 and 95 are connected in series in the order named between a point of B+ potential and chassis ground. The junction of the resistors 93 and 95 is directly connected to the screen grid 85, the resistors 93 and 95 thus providing a voltage divider establishing an operating DC potential for the screen grid 85.

Operating potential for the anode 89 is supplied thereto via the anode load resistor 97, connected between the anode 89 and the B+ source. The demodulator 70 is provided with an output terminal XO, coupled to the anode 89 via an RF choke 98. An RF bypass capacitor is coupled between the output terminal XO and chassis ground. The choke and bypass capacitor serve to filter out the two demodulator input signals and the "sum" frequency products of the heterodyning action in pentode 80, leaving the "difference" frequency products of the heterodyning action to appear at output terminal XO.

The signals appearing at the X demodulator output terminal XO, together with the output of the Z demodulator 100, are applied to color matrix circuits 110, which serve to suitably combine the respective demodulator outputs to provide respective R–Y, B–Y and G–Y outputs at the matrix output terminals so designated. Reference may be made to U.S. Patent No. 2,830,112, issued on Aug. 8, 1958, to Dalton H. Pritchard, for an explanation of operating principles that may be employed to govern the design of the matrixing circuitry and the choice of the X and Z demodulating phases. The output terminals R–Y, B–Y and G–Y are coupled to the respectively appropriate control grids of the three guns of color kinescope 40.

It should be noted that in the operation of the illustrated X demodulator circuit embodiment, the pentode control grid is maintained positively biased with respect to the cathode thereof. An important effect of this biasing is that the screen grid of a pentode drawing grid current requires relatively little energizing voltage to obtain peak anode currents. As a consequence, an oscillator output of a practical amplitude level (e.g., 50 volts, peak-to-peak) is sufficient to exercise wide control over the magnitude of anode current; i.e., a readily realizable signal level at the screen grid can swing the anode current of the pentode between conditions approaching both cut-off and saturation, thereby allowing use of the screen grid as a highly effective control electrode for synchronous demodulation purposes.

Readily demonstratable performance advantages, akin to those obtainable using a pentagrid type tube, are obtained in use of the illustrated circuit through the device employed is a relatively inexpensive power pentode. Notable among the obtainable advantages are the sufficiency of relatively low levels of the two input signals, and the provision of effective isolation between their sources.

By way of example only, the table below sets forth a set of parameter values successfully employed in use of the illustrated circuit, with a type 6AQ5 tube serving as pentode 80, with +5 volts supplied to the ungrounded terminal of potentiometer 73, and with resistors 93 and 97 connected to a +270 volt DC supply:

| | | |
|---|---|---|
| Potentiometer **73** | ohms | 500 |
| Resistor **93** | do | 560,000 |
| Resistor **95** | do | 56,000 |
| Resistor **97** | do | 10,000 |
| Capacitor **91** | microfarads | .01 |
| Capacitor **99** | micromicrofarads | 10 |
| Inductor **98** | microhenries | 620 |

It should be appreciated that, while the present invention has been explained above in conjunction with the illustration of one particular color demodulator circuit configuration, the screen grid control principles of the invention may be applied to other particular circuit configurations. In this regard, attention is directed to the copending application, Ser. No. 450,706, of Larry A. Cochran and John A. Konkel, entitled "Color Demodulators," and filed concurrently herewith on April 26, 1965, wherein a modification of the above-described color demodulator circuitry is disclosed. In accordance with the Cochran, et al. modification, the color demodulator pentodes are subject to chrominance signal driving of their screen grids, with each screen grid, as herein, supplied with an abnormally low unidirectional operating potential; the local color oscillations are applied, in appropriate phases, to the control grids of the demodulator pentodes, in accordance with a self-biasing arrangement, whereby grid current is drawn only at the time of the positive peaks of the applied oscillations. Practical operating advantages obtainable in use of such a modification are discussed in the copending Cochran, et al. application.

What is claimed is:

1. In a color television receiver, the combination including:
- a source of modulated color subcarrier waves;
- a source of unmodulated color reference oscillations of nominal subcarrier frequency and of a relatively fixed phase;
- an electron discharge device having a cathode, control grid, screen grid, suppressor grid and anode electrodes, said suppressor grid being directly connected to said cathode;
- means applying a unidirectional bias potential to said screen grid which is appreciably lower than the maximum screen grid potential rating of said pentode;
- means for biasing said control grid to draw grid current;
- means for heterodyning signals from said two sources in said device including means for varying the potential at said control grid in accordance with the output of said sources of modulated color subcarrier waves, and means for varying the potential at said screen grid in accordance with the output of the source of unmodulated color reference oscillations;
- and output circuit means coupled to said anode electrode for selectively deriving the difference frequency product of the heterodyning action in said device.

2. In a color television receiver, the combination including:
- a chrominance signal amplifier having an output terminal;
- a local color reference oscillator having an output terminal;
- a pentode having cathode, control grid, screen grid, suppressor grid and anode electrodes, said suppressor grid being directly connected to said cathode;
- means for biasing said control grid to draw grid current;
- means applying an operating unidirectional potential to said screen grid which is appreciably lower than the maximum screen grid potential rating of said pentode;

- means providing a signal path between said output terminal of said chrominance signal amplifier and said control grid whereby the potential at said control grid is varied in accordance with said chrominance signal, the drawing of grid current by said control grid being sustained in the face of said potential variations;
- means providing a signal path between said output terminal of said reference oscillator and said screens grid;
- and means for deriving an output signals from said anode.

3. In a color television receiver, the combination including:
- a chrominance signal amplifier having an output terminal;
- a color reference oscillation source having an output terminal;
- a pentode having cathode, control grid, screen grid, suppressor grid and anode electrodes, said suppressor grid being directly connected to said cathode;
- means applying an operating unidirectional potential to said screen grid which is appreciably lower than the maximum screen grid potential rating of said pentode;
- means providing a first signal path between one of said output terminals and said control grid;
- means for establishing a bias potential difference between said control grid and cathode electrodes so related to the magnitude of signals conveyed to said control grid via said first signal path as to ensure that anode current is drawn in said pentode under control grid current conditions causing the magnitude of said anode current to be significantly responsive to screen grid potential deviations, about said operating unidirectional potential, of peak-to-peak level that is small compared to said maximum screen grid potential rating;
- means for varying the potential at said screen grid in accordance with signals appearing at the other of said output terminals;
- and means responsive to said anode current for selectively deriving an output signal corresponding to the difference frequency product of a heterodyning said chrominance signal and said color reference oscillations.

References Cited

UNITED STATES PATENTS

| | | | |
|---|---|---|---|
| 2,250,708 | 6/1941 | Herz | 329—50 X |
| 2,824,172 | 2/1958 | Cherry | 178—5.2 X |

OTHER REFERENCES

Pritchard et al.: Color Television Signal Receiver Demodulators, R.C.A. Review, vol. 14, No. 2, June 1953, TK6540.R122, pp. 215–222.

JOHN W. CALDWELL, *Acting Primary Examiner.*

J. A. O'BRIEN, *Assistant Examiner.*